United States Patent [19]

McTaggart

[11] Patent Number: 5,201,285
[45] Date of Patent: Apr. 13, 1993

[54] CONTROLLED COOLING SYSTEM FOR A TURBOCHARGED INTERNAL COMBUSTION ENGINE

[75] Inventor: Lester E. McTaggart, Jackson, Tenn.

[73] Assignee: Touchstone, Inc., Jackson, Tenn.

[21] Appl. No.: 780,708

[22] Filed: Oct. 18, 1991

[51] Int. Cl.⁵ .............................................. F01P 1/06
[52] U.S. Cl. ............................. 123/41.31; 123/41.29; 123/41.33; 123/41.51
[58] Field of Search .................. 123/41.02, 41.1, 41.12, 123/41.29, 41.31, 41.33, 41.51, 563; 60/599

[56] References Cited

U.S. PATENT DOCUMENTS

| | | | |
|---|---|---|---|
| 3,486,488 | 12/1969 | Frings | 123/41.33 |
| 3,516,231 | 6/1970 | George | 55/267 |
| 3,841,064 | 10/1974 | Hitchiner et al. | 55/269 |
| 4,325,219 | 4/1982 | Stang et al. | 60/599 |
| 4,475,485 | 10/1984 | Sakakibara et al. | 123/41.12 |
| 4,485,624 | 12/1984 | Melchior | 60/599 |
| 4,517,929 | 5/1985 | Musick et al. | 123/41.1 |
| 4,520,767 | 6/1985 | Roettgen et al. | 123/41 |
| 4,550,692 | 11/1985 | Crofts, Sr. | 125/41.1 |
| 4,563,983 | 1/1986 | Hayashi et al. | 123/41.21 |
| 4,620,509 | 11/1986 | Crofts | 123/41.1 |
| 4,697,551 | 10/1937 | Larsen et al. | 123/41.31 |

FOREIGN PATENT DOCUMENTS 2038939 7/1980 United Kingdom ............. 123/41.51

Primary Examiner—Noah P. Kamen
Attorney, Agent, or Firm—Head & Johnson

[57] ABSTRACT

A controlled cooling system for a turbocharged internal combustion engine having a heat exchange radiator, liquid coolant to absorb heat from the engine, a pump to circulate coolant through the system, a fan to force air in heat exchange with the engine coolant radiator and a radiator for the charge-air after cooler coolant. The cooling and turbocharge system includes a temperature control valve to direct a portion of the liquid coolant discharged from the engine to the radiator and to direct a portion of the liquid coolant to bypass the radiator in response to the temperature of the liquid coolant after discharge from the engine. A liquid subcooler heat exchanger lowers the temperature of the liquid coolant by passing the coolant in heat exchange with forced air from the fan. A flow control valve directs a portion of the liquid coolant discharged from the radiator to the subcooler heat exchanger and the remainder of the liquid coolant to the engine. An aftercooler heat exchanger lowers the temperature of the combustion air discharged from the turbocompressor by passing the combustion air charge in heat exchange with the liquid coolant from the subcooler heat exchanger.

2 Claims, 3 Drawing Sheets

CONTROLLED COOLING SYSTEM FOR A TURBOCHARGED INTERNAL COMBUSTION ENGINE

BACKGROUND OF THE INVENTION

1. Field of the Invention

The present invention relates to a cooling system for turbocharged internal combustion engines. In particular, the present invention relates to a cooling system having a modified radiator wherein a portion of the liquid coolant may be bypassed around the radiator to provide temperature control, operating in series with a second radiator wherein a portion of the liquid coolant is subcooled before being utilized in the turbocharger aftercooler and wherein fan velocity is adjusted as a function of ambient air temperature and engine load. (Thermal stress in the radiator and subcooler are minimized by the incremental application of temperature change across two systems.)

2. Prior Art

The cooling system for an internal combustion engine is designed to remove heat caused by friction in the engine. One component of the cooling system is a radiator which passes liquid coolant in heat exchange with air in order to throw off or dissipate heat into the atmosphere.

Manipulation of the velocity of a fan or fans forcing air in heat exchange with the radiator will partially control the temperature of the coolant and, in turn, the engine.

The proper engine operating temperature is an important factor in efficient engine operation. At low ambient temperatures, engine operating temperature can actually be below the optimum operating temperature. In this case, the efficiency of the engine is decreased and the quantity of pollutants discharged will be increased due to inefficient performance.

The use of turbocharging to increase the power of an internal combustion engine has been known since at least the early part of this century. The air to be mixed with fuel to provide the proper air/fuel mixture is compressed prior to combustion in order to increase the number of molecules per given volume. The compressed charge that comes out of the turbocharger is not only denser but hotter as well. Since a cooler combustion mixture is desirable to enhance combustion efficiency and lower the quantity of exhaust pollutants, the combustion mixture may be passed in heat exchange with the liquid coolant after discharge from the radiator.

In many instances, however, the coolant temperature is only 10° F. to 15° F. below the engine operating temperature.

Applicant is aware of the following U.S. patents:

| U.S. Pat. No. | Patentee |
|---|---|
| 3,516,231 | George |
| 3,841,064 | Hitchiner et al. |
| 4,325,219 | Stang et al. |
| 4,485,624 | Melchior |
| 4,517,929 | Musick et al. |
| 4,520,767 | Roettgen et al. |
| 4,550,692 | Crofts, Sr. |
| 4,563,983 | Hayashi et al. |
| 4,620,509 | Crofts |

In Hayashi (U.S. Pat. No. 4,563,983), the rate at which vapor from both the turbocharger intercooler and the engine coolant system is condensed in a common radiator in a manner to raise the pressure within the system and increase the boiling point of the coolant during low load modes such as urban cruising while lowering the pressure and boiling point in response to high speed/load engine operation.

George (U.S. Pat. No. 3,516,231) discloses an aftercooler used between the compressor and reservoir in an air supply line which cools the air from the compressor, filters out water and dirt, condenses moisture and oil vapors into liquids, automatically ejecting the contaminants every compressor cycle and automatically unloading the aftercooler to atmospheric pressure between each compressor cycle.

Hitchiner (U.S. Pat. No. 3,841,064) provides an aftercooler for cooling and cleaning compressed air.

Stang (U.S. Pat. No. 4,325,219) discloses a coolant system including a turbocharger and an aftercooler. Each loop further includes a temperature responsive flow control thermostat.

Melchior (U.S. Pat. No. 4,485,624) discloses a supercharged engine equipped with a cooling system including a radiator for the liquid cooling of the engine and a radiator for the supercharging air delivered by a turbocompressor.

Musick (U.S. Pat. No. 4,517,929) provides a self-adjusting cooling system for an internal combustion engine.

Roettgen (U.S. Pat. No. 4,520,767) provides a cooling system for a turbocharged diesel engine having an aftercooler and an oil cooler.

Crofts (U.S. Pat. No. 4,550,692) provides an engine cooling system wherein coolant is circulated through a circuit including an engine, a radiator and an aftercooler. Means are provided for automatically regulating the temperature of the coolant passing through the aftercooler.

Crofts (U.S. Pat. No. 4,620,509) provides a cooling system which selectively directs coolant through one of two circuits or simultaneously through both circuits dependent upon the temperature of the coolant. Also includes a thermostatically controlled primary valve.

Larsen (U.S. Pat. No. 4,697,551) provides a method and apparatus for quickly adjusting the coolant flow in a tuned, low-flow coolant system to maintain the temperature of air leaving an aftercooler.

While some of the foregoing disclose systems for controlling circulation of coolant, none of the prior art discloses a system of controlling the temperature of the coolant through bypassing a portion around the radiator, by directing a portion of the liquid coolant that has passed through the radiator to a subcooler prior to introduction to the turbocharging system, and, at the same time, controlling the fan speed in view of the ambient air temperature and the engine load. None of the prior art utilize series flow between heat exchange units to achieve incremental temperature changes which will permit lower charge-air coolant temperatures with lower thermal stress across the heat exchanger units.

SUMMARY OF THE INVENTION

The present invention provides a cooling system which maintains a desirable high operating temperature in the engine while maintaining as low temperature as possible for the combustion air charge in systems utilizing a liquid-to-air after cooler. Both conditions, high operating temperature and lower charge-air temperature enhance combustion efficiency and decrease exhaust gas pollutant.

Liquid coolant discharged from the engine is conducted to a valve operated by a controller which is in cooperative communication with an inline liquid temperature sensor. The valve directs a portion of liquid coolant to a heat exchange radiator. A portion of the coolant may be bypassed around the radiator and back to the return line. The liquid coolant passing through the radiator will be passed in heat exchange with atmospheric air forced from a fan or fans. The temperature control will be set to a temperature equal to the recommended operating temperature.

The liquid coolant discharged from the radiator will be directed past an inline sensor that measures the flow of coolant. The sensor is operatively connected to a control which operates a valve. A portion of the liquid coolant discharged from the radiator will be directed to a subcooler radiator. The remainder of the liquid coolant will be directed back to a return line.

In the subcooler, the liquid coolant will pass in heat exchange with forced air from the fan. The radiator and subcooler are constructed as a composite radiator with a single fan or fans used therewith. The liquid coolant from the subcooler will thereafter be conducted to an aftercooler heat exchanger.

Successive reductions of flow rates as the coolant progresses from the engine to the radiator to the subcooler allows maximum temperature changes to be realized compatible with available ambient air temperature and power level.

In the turbocharger, a combustion air charge will be compressed in a turbine driven compressor and then directed to the aftercooler heat exchanger. The combustion air charge will be passed in heat exchange relationship with the coolant in the aftercooler prior to being introduced to the engine.

A pump will also be utilized to circulate the coolant through the system.

A speed control for the fan or fans is manipulated by a processor. The processor will be programmed to operate the fans at an optimum speed in response to the ambient air temperature measured by a sensor and in response to the engine load.

BRIEF DESCRIPTION OF THE DRAWINGS

FIG. 4 is an operational schematic illustration of a cooling and turbocharge system constructed in accordance with the present invention.

DETAILED DESCRIPTION OF THE PREFERRED EMBODIMENT

Figure 1:
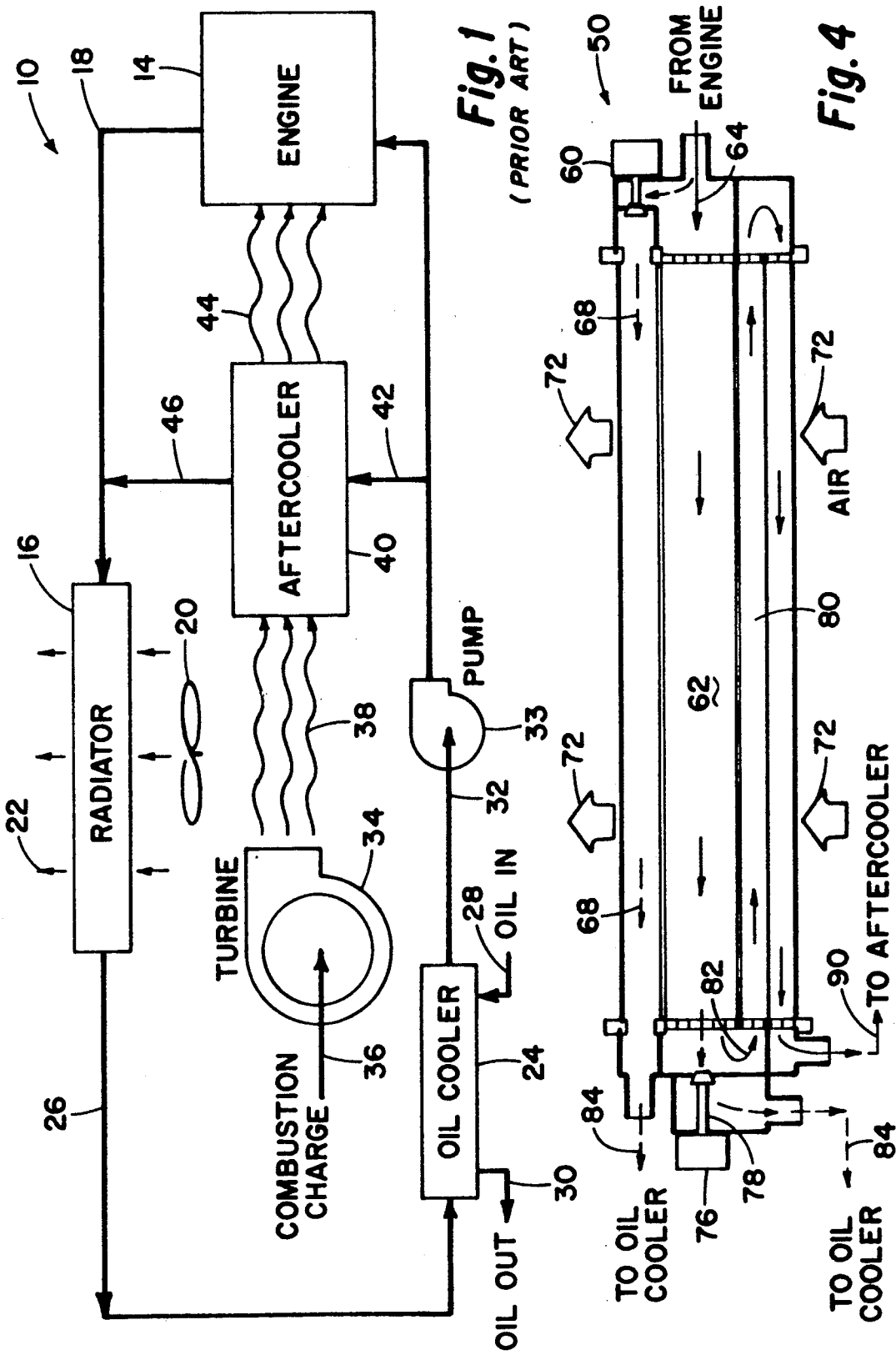
FIG. 1 illustrates a flow diagram of a typical existing cooling system for a turbocharged internal combustion engine as is now known.

Referring to the drawings in detail, FIG. 1 illustrates a typical existing cooling and turbocharge system 10 for an internal combustion engine.

While the present invention will be described in relation to a locomotive engine, it will be recognized that the principles of the invention are equally applicable to automotive engines, industrial engines and other internal combustion engines.

Liquid coolant will be used to pass through the cooling system. The liquid coolant may be water or other liquids as are well known. The liquid coolant will be circulated through the engine 14 in order to absorb heat from the engine. The coolant will be discharged from the engine 14 and conducted to a radiator 16 as shown by arrow 18. The liquid coolant will be passed in heat exchange with forced atmospheric air from a fan 20 as illustrated by the arrows 22. This radiator heat exchanger 16 will cause the heat to be dissipated into the atmosphere and the temperature of the liquid coolant to drop.

The coolant may next be conducted to an oil cooler 24 as illustrated by the arrow 26. The liquid coolant will therein be passed in heat exchange relationship with oil or other liquid. The oil will be brought in, as at 28, and then removed, as at 30, resulting in an increase in the temperature of the liquid coolant. Finally, the liquid coolant will be returned to the pump suction as shown by arrow 32. A pump 33 circulates the liquid coolant through the system. At the same time, the turbocharge system of the engine serves to increase the density of the combustion air charge prior to introduction into the engine. The combustion air charge will be directed to a turbine 34 as shown by arrow 36. Therein, the combustion air charge will be compressed so that the air charge is more dense. The process of compressing the air charge results in an increase in temperature of the charge.

The combustion air charge is thereafter directed to an aftercooler heat exchanger illustrated by the arrows 38. The aftercooler heat exchanger 40 will pass a portion of the liquid coolant which has been diverted from the cooling system circulation as shown by arrow 42. The liquid coolant will be passed in heat exchange with the combustion air charge to lower the temperature of the combustion air charge prior to introduction of the charge to the engine 14 as shown by the arrows 44. The liquid coolant passing through the aftercooler heat exchanger will thereafter be directed back to the cooling circulation system upstream of the radiator as shown by arrow 46.

The foregoing typical cooling and turbocharge system has a number of limitations. The operating temperature of the engine is important to maintain performance efficiency and contain the quantity of pollutants at the lowest possible level. In the situations where low power and/or low ambient temperature is encountered, the temperature of the engine may actually be below the recommended operating temperature. At the same time, it is desirable to reduce the temperature of the combustion air charge to a considerable degree. The degree of cooling is limited by the coolant temperature available from the pump discharge.

The present invention seeks to maintain a desirable operating temperature in the engine while providing a lower temperature for the combustion air charge in order to enhance the efficiency of the engine and lower the amount of exhaust pollutants.

Figure 2:
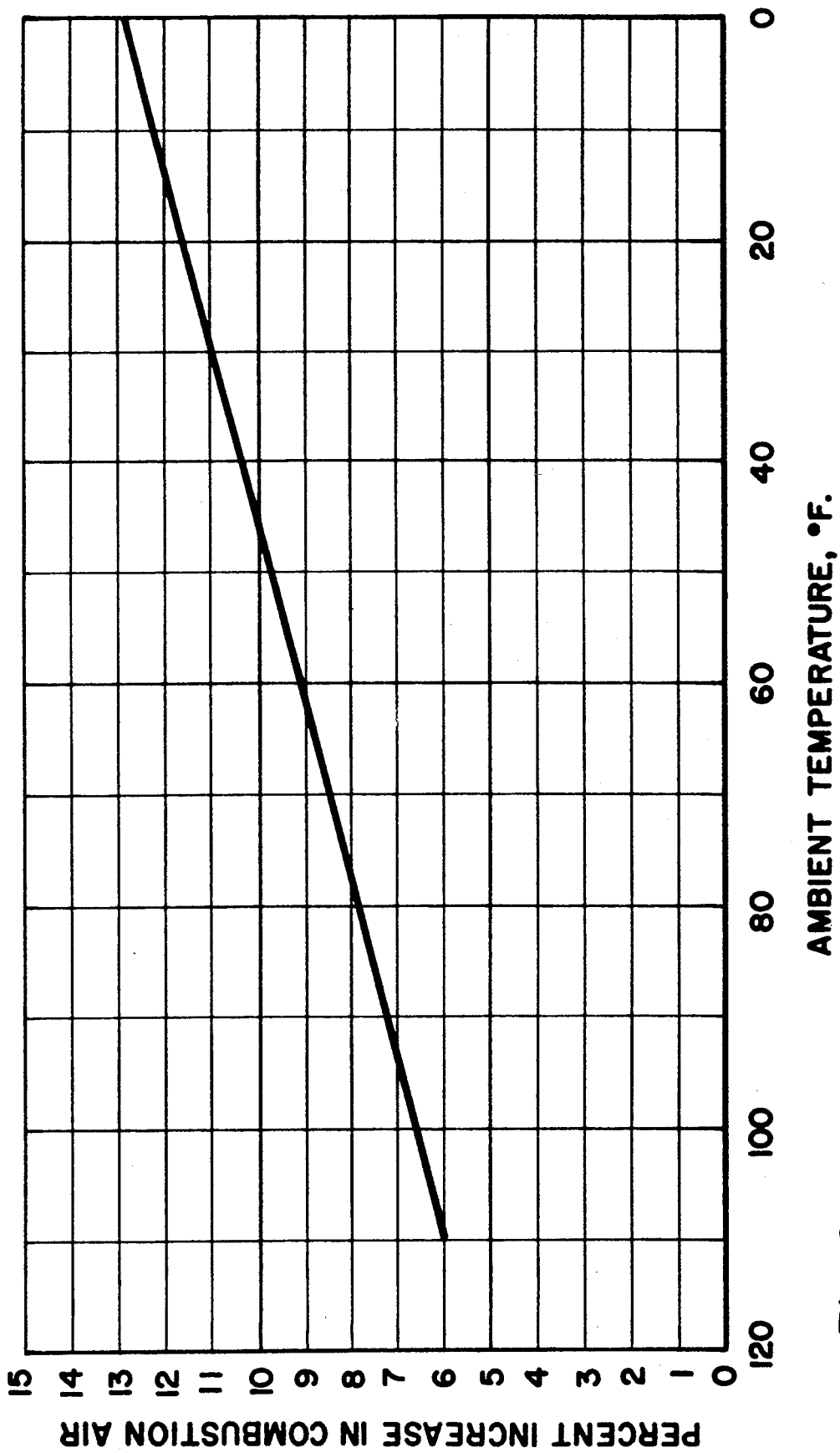
FIG. 2 is a graph showing the relationship between the ambient air temperature and the percent increase in combustion air for use in an internal combustion engine relative to the existing cooling system.

FIG. 2 illustrates the relationship between the ambient air temperature and the percentage increase in the combustion air charge to be realized with the present invention relative to the existing system as illustrated in FIG. 1. As reflected in the chart, the density of the charged air will increase, and in turn the quantity of oxygen available for combustion, as the ambient temperature decreases.

Figure 3:
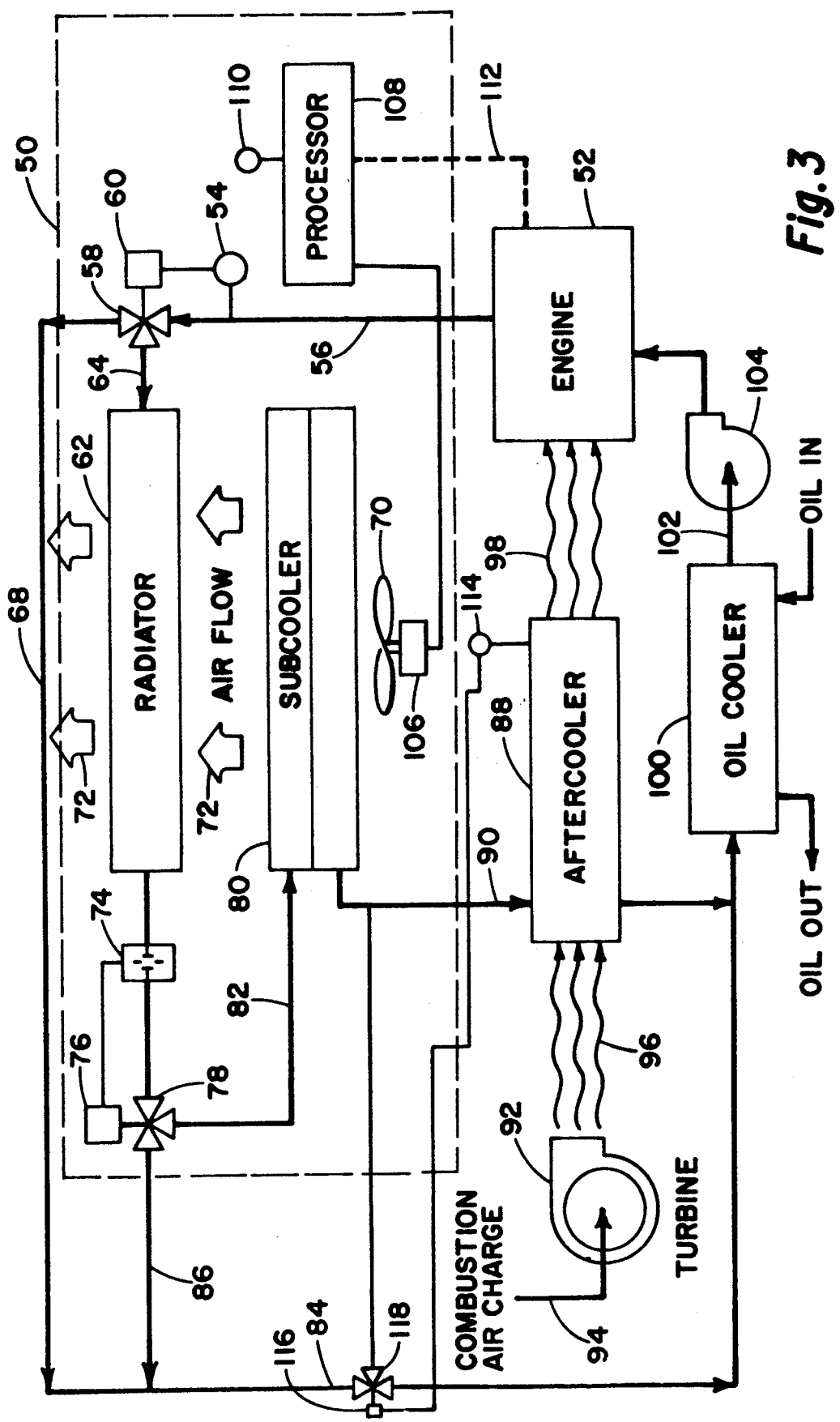
FIG. 3 is a diagrammatic representation of a cooling and turbocharge system for internal combustion engine as found in the present invention.

FIG. 3 illustrates a flow chart showing the present invention 50 within a dashed line box. Liquid coolant discharged from the engine 52 is conducted past a liquid temperature sensor 54 as illustrated by the arrow 56. The liquid coolant is directed to a valve 58 operated by a controller 60 in response to the temperature of the coolant. A portion of the coolant will at all times be directed to a radiator 62 as illustrated by arrow 64. A portion of the coolant may be bypassed around the radiator heat exchanger 62 as shown by arrow 68. The liquid coolant which passes through the radiator 62 will be passed in heat exchange with atmospheric air forced from a fan 70 as indicated by the arrows 72.

Control 60 will be set to a temperature equal to the recommended engine operating temperature. If the coolant temperature drops below the set point as monitored by the temperature sensor 54, the valve 58 will decrease the coolant flow through the engine radiator. This will cause the liquid coolant that circulates through the system back to the engine 52 to increase in temperature. As the temperature of the liquid coolant rises, the engine temperature will rise.

Conversely, as the coolant increases in temperature above the set point, the control 60 will cause the valve 58 to increase the flow of coolant through the engine radiator and even close off the bypass 68 as the coolant temperature exceeds a preselected maximum temperature.

The liquid coolant that is discharged from the radiator 62 will be directed past an inline sensor 74 that measures the flow of coolant. The sensor 74 is operatively connected to a control 76 which operates a valve 78. A portion of the liquid coolant discharged from the radiator will be directed to a subcooler radiator 80 as illustrated by arrow 82. The remainder of the liquid coolant will be directed back to the return line 84 as shown by arrow 86. The control 76 will proportion the coolant discharge from the radiator between the subcooler radiator and the return line 84. As an example, one-third of the coolant from the radiator may be directed to the subcooler. The quantity of coolant diverted through the subcooler will be determined by the aftercooler performance characteristics.

The liquid coolant at the subcooler 80 will pass in heat exchange relationship with forced air from the fan 70. It will be observed that a single fan or set of fans may be used not only for the subcooler 80 but the radiator 62 as well. The radiator 62 and subcooler 80 are constructed as a composite radiator with a single fan or fans. The liquid coolant from the subcooler will thereafter be conducted to an aftercooler heat exchanger 88 as illustrated by the arrow 90. An inline temperature sensor 114 monitors the combustion air charge temperature. At a predetermined temperature a control 116 actuates bypass valve 118 to prevent overcooling of the combustion air charge.

As previously described with regard to FIG. 1, a combustion air charge will be compressed in a turbocompressor 92 as shown by the arrow 94. The compressed charge will be directed to the aftercooler heat exchanger 88 as shown by arrows 96. The combustion air charge will be passed in heat exchange relationship with the coolant in the aftercooler 88 prior to being introduced to the engine 52 as shown by the arrows 98.

An optional oil cooler 100 may exist in the coolant loop. The liquid coolant will pass in heat exchange relationship therewith in order to further increase the temperature of the coolant prior to re-introduction to the engine 52 as shown by arrow 102. A pump 104 will also be utilized to circulate the coolant through the system as is well known in the art.

The heat exchange which takes place in the subcooler 80 and radiator 62 may be controlled, to a degree, by the speed of the fan or fans 70. Accordingly, a speed control 106 is connected with the fan 70. The speed control 106 is manipulated by a processor 108. The processor will be programmed to operate the fan at an optimum speed in response to the ambient air temperature which is measured by a temperature sensor 110 and in response to the engine load shown by dashed lines 112. For example, as the ambient air temperature decreases, the fan speed may be decreased. Fan speed may be decreased when the engine is operating at low power levels.

It will be observed that the temperature of the liquid coolant system, and the heat rejection, will be controlled by the fan speed as well as by the quantity of coolant which bypasses the radiator shown by valve 58 and arrow 68.

FIG. 4 illustrates an operational diagram of the cooling system of the present invention 50. The coolant from the engine will be discharged so that a portion will pass into the radiator 62 as shown by arrow 64. A control 60 may allow a portion of the coolant to bypass the radiator as shown by arrow 68. The coolant bypassing the radiator 62 will be discharged to the return line 84 to return to the engine.

At the same time, the coolant which passes through the radiator 62 will pass to a flow control valve 78 manipulated by a control 76. A portion of the liquid coolant discharged from the radiator will be directed to a subcooler 80 as shown by arrows 82. The subcooler heat exchanger decreases the temperature of the liquid coolant prior to introduction to the aftercooler 88 of the turbocharge system.

It can be readily observed from the drawing of FIG. 4 that the forced air from the fan, as shown by arrows 72, will be utilized for both the radiator and subcooler.

Whereas, the present invention has been described in relation to the drawings attached hereto, it should be understood that other and further modifications, apart from those shown or suggested herein, may be made within the spirit and scope of this invention.

What is claimed is:

1. A cooling system for a turbocharged internal combustion engine having heat exchange radiator means, liquid coolant to absorb heat from said engine, pump means to pump said coolant through said cooling system, fan means to force air in heat exchange with said radiator means, and turbocompressor means to increase the density of a combustion air charge, which cooling system comprises:

temperature control valve means to direct a portion of said liquid coolant discharged from said engine to said radiator means and to direct a portion of said liquid coolant to bypass said radiator means in response to the temperature of said liquid coolant after discharge from said engine;

liquid subcooler heat exchange means to lower the temperature of said liquid coolant by passing in heat exchange with forced air from said fan means;

flow control valve means to direct a portion of said liquid coolant discharged from said radiator means to said liquid subcooler heat exchange means and the remainder of said liquid coolant to said engine wherein said flow control valve means includes a flow sensor to sense liquid coolant and signal means in communication with said flow control means to control the portion of coolant to said subcooler means;

aftercooler heat exchange means to lower the temperature of said combustion air charge discharged from said turbocompressor means by passing said combustion air charge in heat exchange with said liquid coolant from said subcooler heat exchange means; and fan speed control means to control the speed of said fan in response to ambient air temperature and in response to load on said engine.

2. A cooling apparatus for an engine having liquid coolant to absorb heat from said engine, pump means to pump said coolant, which apparatus comprises:

an elongated heat exchange radiator to receive said liquid coolant;

a temperature control valve at one end of said radiator to direct a portion of said liquid coolant discharged from said engine to said radiator and to direct a portion of said liquid coolant to bypass said radiator;

an elongated liquid subcooler parallel and aligned with said radiator, said subcooler in fluid communication with said radiator through a passage from the end of said radiator opposite said temperature control valve to an end of said subcooler;

a flow control valve within said passage to direct a portion of said liquid coolant discharged from said radiator to said subcooler and the remainder to said engine;

a fan to force ambient air in heat exchange with said subcooler and thereafter with said radiator; and fan speed control means to control the speed of said fan in response to ambient air temperature and in response to load on said engine.

* * * * *